(12) United States Patent
Gochenour et al.

(10) Patent No.: US 6,666,313 B2
(45) Date of Patent: Dec. 23, 2003

(54) DUAL MASS CLUTCH SYSTEM

(75) Inventors: Daniel V. Gochenour, Auburn, IN (US); Michael L. Bassett, Aubrun, IN (US); Kevin F. Schlosser, Auburn, IN (US); Mark L. Beakas, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/107,916

(22) Filed: Mar. 27, 2002

(65) Prior Publication Data

US 2003/0183471 A1 Oct. 2, 2003

(51) Int. Cl.⁷ .................. F16D 47/02; F16D 13/58
(52) U.S. Cl. ............... 192/55.61; 192/70.17; 192/85 AA; 192/84.7
(58) Field of Search .............. 192/55.3, 55.61, 192/70.17, 85 AA, 84.7, 84.91

(56) References Cited

U.S. PATENT DOCUMENTS

| | | | |
|---|---|---|---|
| 1,842,039 A | * 1/1932 | Matthews | ............... 192/55.61 |
| 5,092,825 A | 3/1992 | Goscenski, Jr. et al. | |
| 5,273,372 A | 12/1993 | Friedmann et al. | |
| 5,374,218 A | 12/1994 | Reik et al. | |
| 5,435,201 A | 7/1995 | Preston et al. | |
| 5,441,137 A | 8/1995 | Organek et al. | |
| 5,469,948 A | 11/1995 | Organek et al. | |
| 5,499,951 A | 3/1996 | Showalter | |
| 5,505,285 A | 4/1996 | Organek | |
| 5,528,950 A | 6/1996 | Organek et al. | |
| 5,788,037 A | 8/1998 | Forsyth et al. | |
| 5,802,915 A | 9/1998 | Organek et al. | |
| 5,813,508 A | * 9/1998 | Shoji et al. | ............ 192/113.34 |
| 5,819,883 A | 10/1998 | Organek et al. | |
| 6,044,727 A | * 4/2000 | Yamamoto | ................... 74/574 |
| 6,332,521 B1 | * 12/2001 | Shoji | ....................... 192/55.61 |
| 2002/0033313 A1 | * 3/2002 | Katou et al. | ............. 192/55.61 |

* cited by examiner

*Primary Examiner*—Richard M. Lorence
(74) *Attorney, Agent, or Firm*—Loren H. Uthoff, Jr.

(57) ABSTRACT

A dual mass flywheel and clutch system for minimizing torsional vibration levels during engine start-up and during low speed engine operation where the rotational moment of inertia of a clutch input assembly is minimized to raise the torsional natural frequency of the dual mass clutch system above the engine firing frequency when the clutch is disengaged to reduce the level of torsional vibration during engine start-up. After engine start-up, the dual mass clutch system is engaged and the torsional natural frequency of the clutch system returns to a lower frequency due to the rotation of the clutch output assembly thereby effectively reducing the torsional vibration levels in the vehicle driveline in a normal manner.

18 Claims, 3 Drawing Sheets

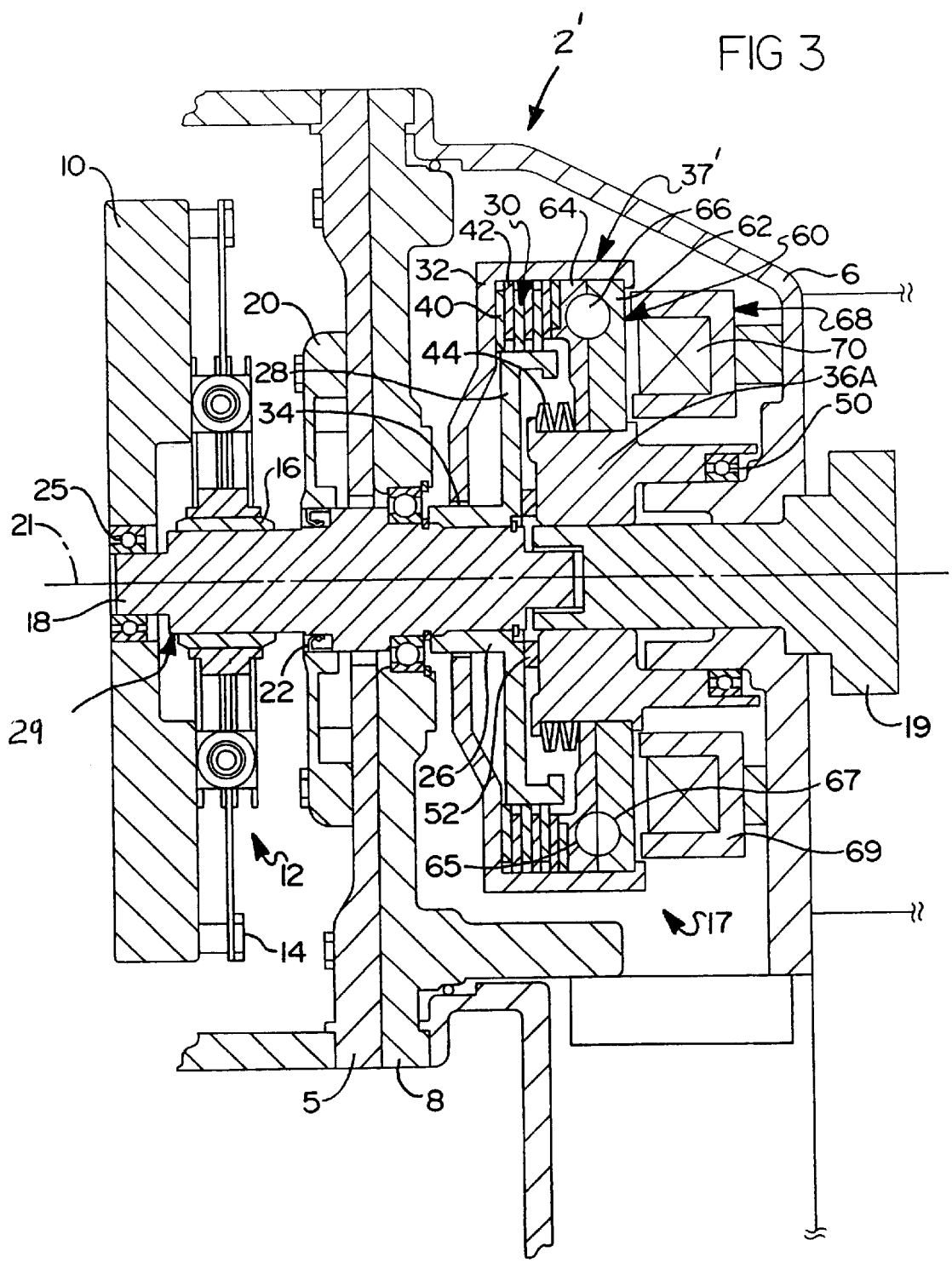

DUAL MASS CLUTCH SYSTEM

FIELD OF THE INVENTION

The present invention relates to a dual mass vehicle driveline master clutch. More specifically, the present invention relates to a dual mass vehicle driveline master clutch where the rotating inertia of the clutch when disengaged is minimized to reduce torsional vibration levels at low engine speeds.

BACKGROUND OF THE INVENTION

The present invention relates to an apparatus for damping the torsional vibrations generated by a firing internal combustion engine which are transferred into the driveline via the master clutch. It is known to use split dual flywheels, one on each side of a compliant member such as a spring damper to lower the level of these torsional vibrations where a clutch assembly is attached to the second flywheel and contributes to its rotational inertia. It is also known to use dual masses without a split flywheel with one rotational inertial mass upstream of the damper and a second rotational inertial mass downstream of the damper to lower the level of torsional vibrations transferred to the driveline. Both of these systems can improve overall vehicle driveability and increase the service life of the various driveline components.

U.S. Pat. Nos. 5,374,218; 5,273,372 and 5,788,037, the disclosures of which are hereby expressly incorporated by reference, all disclose various variations of dual mass and split flywheel type systems for lowering torsional vibrations. U.S. Pat. No. 5,788,037 discloses a clutch system where the rotational inertia of the clutch input hub is increased with the addition of weights in an effort to more effectively control torsional vibration generated by the engine at the engine firing frequency. This prior art system has one significant disadvantage in that the torsional vibrations during engine start-up will be increased by the added mass to the clutch.

In a dual mass split flywheel system, the mass of the flywheel is split into a first mass and a second mass where the first mass is attached to the engine side of the damper and the second mass is attached to the clutch side of the damper.

It would be advantageous if the torsional natural frequency of the flywheel/clutch system could be raised during engine start-up and then lowered for more effective control of the driveline torsional vibration levels due to engine firing in normal operation.

More specifically, the major problem with the prior art dual mass and split flywheel and other dual mass systems is that the natural frequency of the system is relatively low even when the master clutch is disengaged. This creates a problem when the engine is started in that the frequency of the torsional vibration excitation generated by the engine at some point in the engine start-up sequence matches the natural frequency of the prior art dual mass system causing high vibration levels in the driveline and into the passenger compartment.

In general, the first rotational mass of a dual mass system consists of the engine flywheel and the second mass consists of a clutch input assembly which includes the input shaft, the clutch input hub and the drive friction discs when the clutch is disengaged and in addition, the clutch driven friction discs and output hub when the clutch is engaged. The first mass is connected to the second mass through a damper element which is commonly a spring damper which contributes to both inertia masses. The rotational inertia and hence the torsional natural frequency of the dual mass system varies according to the state of engagement of the clutch assembly. In general, as the excitation frequency produced by the engine matches the natural frequency of the flywheel/damper/clutch system, the resulting torsional vibration levels increase dramatically until the engine reaches a sufficient speed so as to increase the engine's excitation torsional frequency above the natural frequency of the flywheel/damper/clutch system. High levels of driveline torsional vibration can damage the driveline and are disconcerting to the operator.

SUMMARY OF THE INVENTION

The present invention provides for a reduced level of torsional vibration produced in the driveline and then transferred into the vehicle cab at very low engine speeds and especially during engine start-up. Engine start-up is commonly performed with the clutch disengaged and to perform as intended, the present invention requires this. According to the present invention, the rotational moment of inertia of the second mass (limited to the rotating portion of the clutch assembly when the clutch is disengaged) is minimized by designing the clutch input assembly to minimize its rotational moment of inertia thereby lowering the torsional resonant frequency of the dual mass system when the clutch is disengaged. After the engine reaches a minimum speed, the clutch can then be engaged to link the engine to the complete clutch assembly thereby lowering the torsional natural frequency of the dual mass system for more effectively reducing torsional vibration at higher engine speeds.

Thus, according to the present invention, the difference in magnitude between the rotational inertia of the clutch when engaged verses the rotational inertia when disengaged is significantly increased as compared to prior art systems in order to raise the torsional natural frequency of the dual mass system above the engine firing frequency during engine start-up with the clutch disengaged. The rotational moment of inertia of the clutch input assembly which rotates with the engine irrespective of the state of the clutch, is lowered by decreasing its diameter so that it fits inside the envelope of the clutch output hub. The clutch drive friction discs are also downsized and driven on their inside diameter. After engine start, the clutch is engaged and the torsional resonant frequency of the dual mass system is then lowered to more effectively reduce torsional vibration.

One provision of the present invention is to minimize the rotating moment of inertia of the clutch assembly when it is disengaged as compared to its rotating moment of inertia when the clutch assembly is engaged.

Another provision of the present invention is to minimize the rotational moment of inertia of the clutch assembly when it is disengaged as compared to its rotational moment of inertia when the clutch assembly is engaged by minimizing the rotational moment of inertia of a clutch input assembly.

Still another provision of the present invention is to reduce the magnitude of driveline torsional vibrations during engine start-up by disengaging the clutch and minimizing the rotational inertia of the clutch input assembly to raise the torsional natural frequency of the rotating driveline.

BRIEF DESCRIPTION OF THE DRAWINGS

FIG. 3 is a cross-sectional view of an alternative embodiment of the clutch assembly of the present invention.

DETAILED DESCRIPTION OF THE PREFERRED EMBODIMENTS

Figure 1:
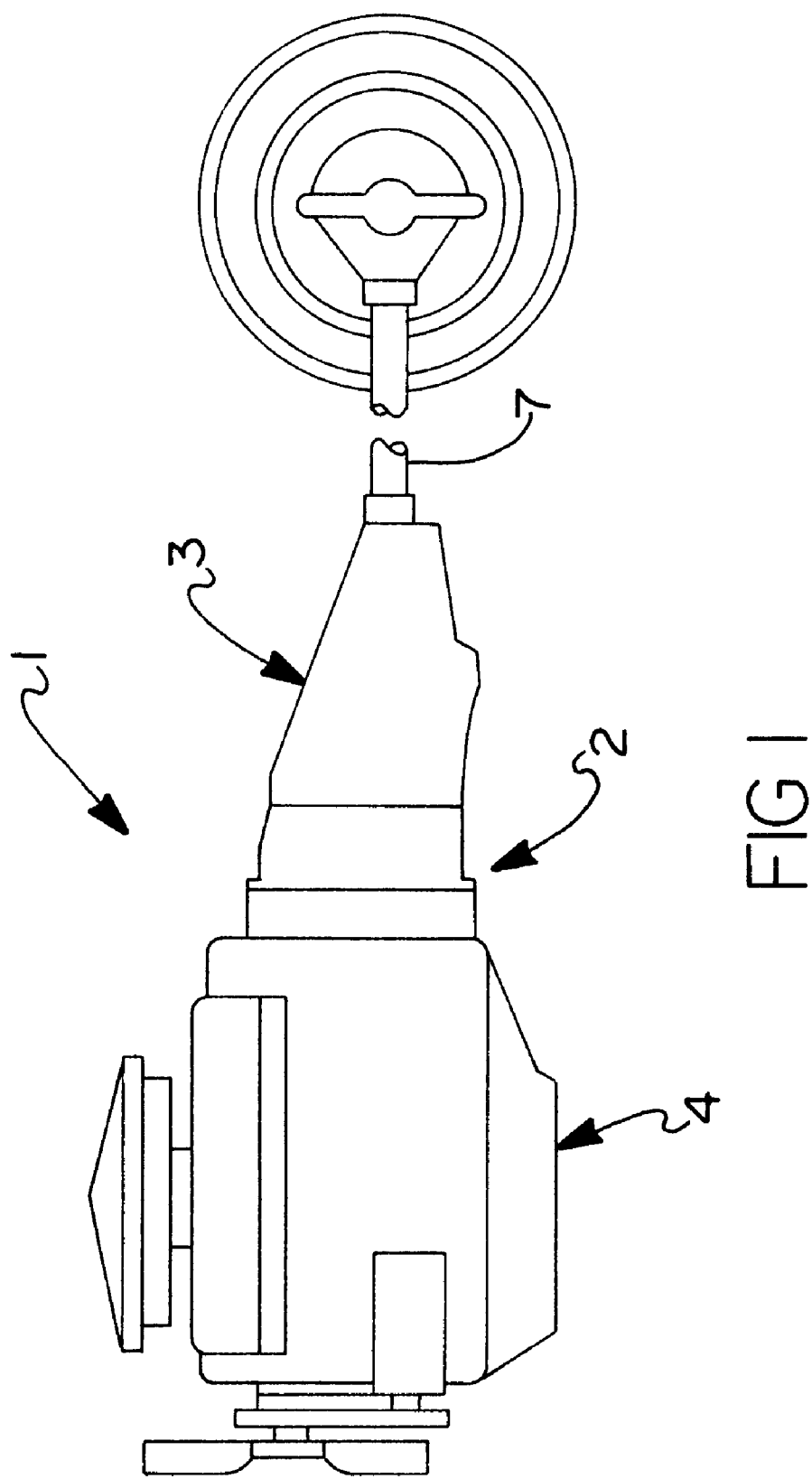
FIG. 1 is a partial schematic view of a vehicle driveline.

Although the term "wet clutch" is used herein, it is to be understood that the term "wet clutch" shall also apply to other types of friction couplings including, but not limited to, dry clutches, spring clutches and ball ramp clutches.

Certain terminology will be used in the following description for convenience in reference only and will not be limiting. For example, the terms "forward" and "rearward" will refer to directions forward and rearward of the clutch as normally mounted in a vehicle. The terms "rightward" and "leftward" will refer to directions in the drawings in connection with which the terminology is used. The terms "inwardly" and "outwardly" will refer to directions toward and away from, respectively, the geometric center of the apparatus. The terms "upward" and "downward" will refer to directions as taken in the drawings in connection with which the terminology is used. All foregoing terms mentioned above include the normal derivatives and equivalents thereof.

Now referring to FIG. 1 of the drawings, a schematic of a vehicle driveline 1 is shown. The dual mass clutch system 2 of the present invention is used to frictionally rotationally link an internal combustion engine 4 to a gear change transmission 3 having an output shaft connected to a driveshaft 7. The dual mass clutch system 2 is the focal point of the improvement provided by the present invention whereby the amplitude of the torsional vibrations generated by the engine 4 and transferred into the rest of the vehicle driveline are reduced, especially at engine start-up.

Figure 2:
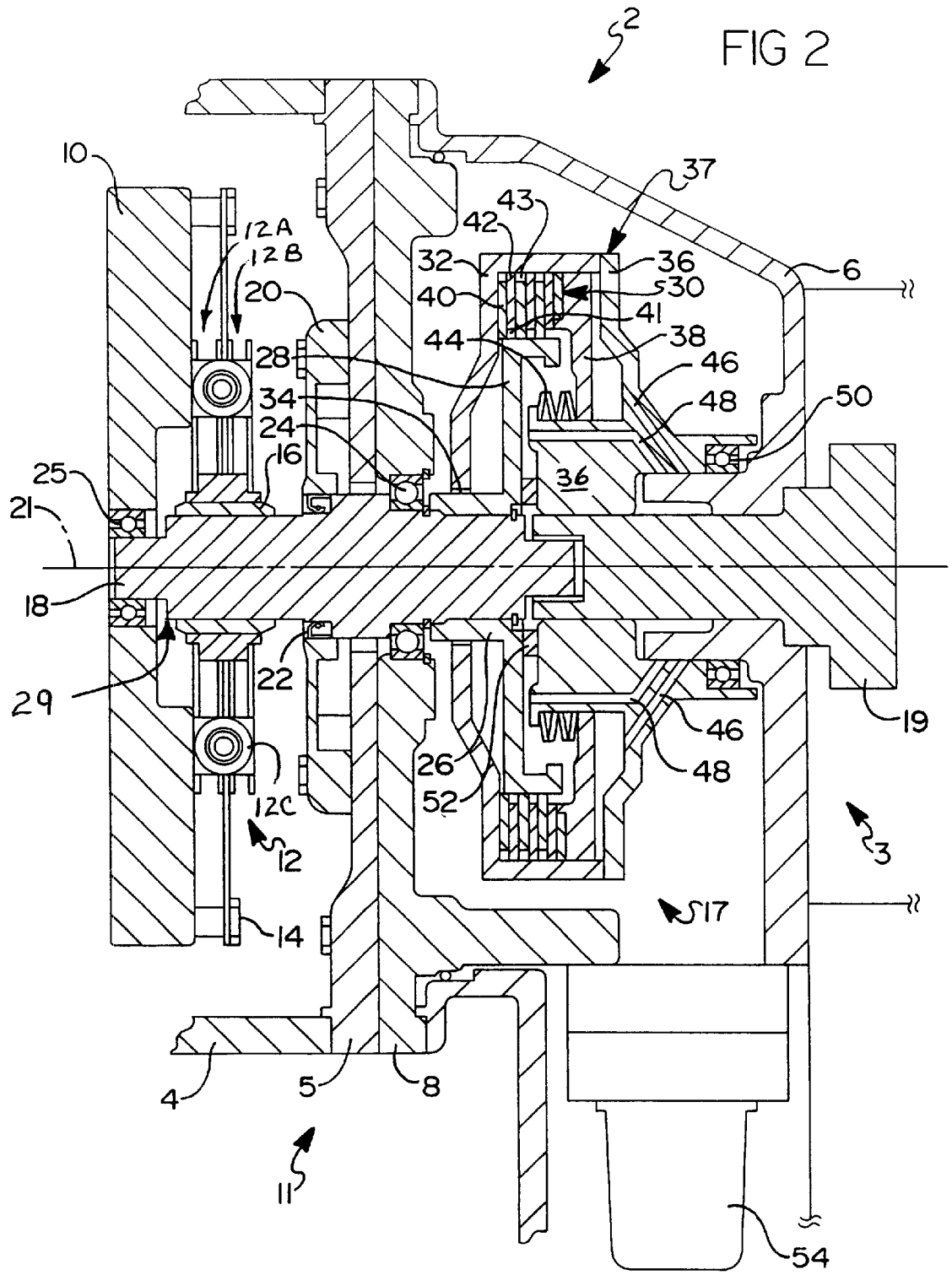
FIG. 2 is a cross-sectional view of the clutch assembly of the present invention.

Now referring to FIG. 2 of the drawings, a cross-sectional view of the dual mass clutch system 2 of the present invention is shown. The dual mass clutch system 2 consists of an engine flywheel 10 rotationally driven by a power source such as an internal combustion engine 4 coupled to a clutch 17 through a spring damper 12 where the damper 12 has a first side 12A attached to the flywheel 10 and a second side 12B connected to the first side 12A through compliant member 12C which is shown as a spring but may be another type of compliant element such as a rubber coupling and/or a viscous fluid coupling or combinations thereof. The effective rotational moment of inertia of the clutch 17 varies according to whether the clutch 17 is engaged or disengaged. The clutch input assembly 29 consists of the input shaft 18, the clutch input hub 26 and the clutch drive friction discs 40 while the clutch output assembly 37 consists of the clutch driven friction discs 42 and the output hub 32 the back hub 36 and the pressure plate 38. The moment of inertia of the flywheel 10, the damper 12, the clutch input assembly 29 and the clutch output assembly 37 along with the driveline system's overall torsional stiffness determines the natural frequency of the dual mass system 2 when the clutch 17 is engaged. When the clutch 17 is disengaged, the clutch output assembly 37 does not contribute to the rotational moment of inertia of the clutch 17 and the torsional natural frequency is raised accordingly. The back hub 36 is connected to rotate with the transmission input shaft 19.

An engine faceplate 5 is attached to the internal combustion engine 4 and also attached to a clutch housing faceplate 8 which is in turn attached to the clutch housing 6. The clutch housing 6 is shown mounted to a gear change transmission 3. The damper 12 can be any type of rotationally compliant member using various technologies to provide a torsional spring effect and usually some damping. The driveline torsional moment of inertia of interest consists of the portion of the driveline which includes the flywheel 10, the damper 12, and the clutch 17, with different inertias depending on whether the clutch 17 is engaged or disengaged.

The engine flywheel 10 is rotatably driven by the internal combustion engine 4 in a nonuniform fashion due to combustion torque pulses. These torque pulses generate torsional vibrations in the flywheel 10. In an attempt to dampen some of the torsional vibrations, the flywheel 10 is attached by retainers 14 to the spring damper 12 which is well known in the art. The spring damper is nonrotatably connected to a clutch input shaft 18 via splined coupling 16. The clutch input shaft 18 is frictionally rotationally coupled to a transmission input shaft 19 through the clutch 17 which is shown in FIG. 2 and is known in the art as a wet clutch although a dry clutch could be used equally as well. Also, although the method shown to load the clutch pack 30 is fluid pressure, a spring or ball ramp actuator or other load generating device could be used as an alternative. Generally, the rotating elements are rotating about an axis of rotation 21.

The clutch input shaft 18 is contacted by seal 22 to prevent migration of the hydraulic fluid used in the clutch assembly 2. The seal 22 is mounted in the seal plate 20 which is attached to the engine faceplate 5. The support bearing 24 is mounted in the clutch housing faceplate 8 and along with the front bearing 25, rotatably supports the clutch input shaft 18.

Nonrotatably attached to the clutch input shaft 18 is a clutch input hub 26 which includes a hub extension 28 which is nonrotatably connected to at least one clutch drive friction disc 40 which together form the clutch input assembly 29. According to the present invention, the rotational inertia of the clutch input assembly 29 is minimized to increase the torsional natural frequency of the clutch 17 when the clutch 17 is disengaged such as during engine start-up . The drive friction disc 40 can axially slide relative to the input hub 26 through a plurality of drive splines 41. The clutch pack 30 is comprised of at least one drive friction disc 40 which is rotationally frictionally coupled to the transmission input shaft 19 when the clutch 17 is engaged through at least one clutch driven friction disc 42. As the clutch pack 30 is loaded, this frictional coupling between the drive friction discs 40 and the driven friction discs 42 takes place. The output hub assembly 37 is shown in FIG. 2 and includes the output hub 32 joined to the back hub 36 and the driven friction discs 42 and the pressure plate 38 where the output hub assembly 37 is frictionally coupled through the clutch pack 30 to be rotatably driven by the hub extension 28 when the clutch 17 is engaged.

A primary feature of the present invention is that the rotational inertia of the clutch input assembly 29 and specifically the input hub 26 is significantly lower than what is disclosed in the prior art. For example, the moment of inertia of the input assembly 29 is at least twenty percent (20%) less than the moment of inertia of the assembly 37. The effect is that the torsional natural frequency of the dual mass system 2 which is comprised primarily of a first inertial mass (the flywheel 10) and a second inertial mass (the clutch 17) is raised significantly when the clutch 17 is disengaged (no load on the clutch pack 30). In the disengaged state, only the input shaft 17, the input hub 26 and the drive friction discs 40 are contributing to the rotational inertia of the clutch 17. As compared to prior art systems, the rotational moment of inertia of the clutch 17 of the present invention, when in a disengaged state, is minimized thereby raising the torsional natural frequency of the dual mass system 2 so that frequency is not reached by the primary engine firing frequency during engine start-up. Once the engine speed increases, the clutch 17 can be engaged thereby increasing the rotational moment of inertia of the clutch 17 and decreasing the torsional natural frequency of the dual mass system 2 to better absorb engine torsional vibration. According to the present invention, the rotational moment of inertia of the clutch input assembly 29 is minimized by altering the functional and geometrical relationships between the clutch input hub 26 and the output hub 32. In prior art systems, the outside diameter of the input hub is significantly larger than that of the output hub where the drive friction discs are necessarily of a larger diameter than that of the driven discs. Thus, the rotational moment of inertia of the input hub and drive friction discs of the prior art clutches are much larger than that of the input hub 26 and driven friction discs 40 of the present invention. This results in large amplitude torsional vibrations during engine start-up even with the clutch disengaged.

In the clutch assembly 17 of the present invention, the outside diameter of the input hub 26 is significantly smaller than that of the output hub 32 where the drive friction discs 40 are necessarily of a smaller diameter than that of the driven discs 42. This structure is significantly different than the prior art where the input hub surrounds the output hub and the drive discs are of a larger diameter than the driven discs. Thus, the rotational moment of inertia of the clutch input assembly 29 of the present invention is minimized as compared to prior art clutch input systems and also as compared to the clutch output assembly 37. When the clutch 17 is disengaged only the rotational moment of inertia of the flywheel 10, the damper 12 and the clutch input assembly 29 are involved and the natural frequency of the dual mass clutch system 2 is raised above the firing frequency during engine start-up thereby lowering torsional vibration levels. After engine start-up, the clutch 17 is engaged and the rotational moment of inertia of the dual mass clutch assembly 2 increases because of the addition of the clutch output assembly 37 to the rotating mass.

If prior art dual mass systems are utilized, this condition is not realized and high torsional vibrations result during engine start-up. The prior art systems utilize clutch input assemblies which couple to the drive friction discs on the outside diameter of the clutch where the input hub is much larger in diameter than the output hub which greatly increases the rotational moment of inertia as compared to the present invention when the clutch is disengaged.

Referring again to FIG. 2, the clutch pack 30 includes a plurality of clutch drive friction discs 40 which are nonrotatably coupled to the input hub 26 via the hub extension 28 and through drive splines 41 and a plurality of clutch driven friction discs 42 which are nonrotatably coupled to a clutch output hub 32 through driven splines 43. The clutch pack 30 is squeezed by axial movement of the pressure plate 38.

The output hub 32 is supported on the clutch input shaft 18 through bearing 34. The output hub 32 is nonrotatably coupled to the transmission input shaft 19 through attachment to the clutch back hub 36. The back hub 36 is axially positioned relative to the clutch input hub 26 by thrust bearing 52 and is supported on the clutch housing 6 through rear bearing 50. Formed in the back hub 36 are a first fluid passage 46 used for applying a fluid pressure to force the pressure plate 38 to the left thereby creating a clamping load on the clutch pack 30 so as to frictionally rotationally couple the clutch input shaft 18 to the transmission input shaft 19. The second fluid passage 48 is a low pressure drain or fill on the opposite side of the pressure plate 38. To return the pressure plate 38 to the right, a Belleville spring 44 is used. The Belleville spring 44 also functions to improve the overall operation and controllability of the clutch 17. The fluid control valve 54 controls the fluid pressures and flows within the first and second fluid passages 46 and 48. This in turn, controls the axial position of the pressure plate 38 and the resultant clamping force applied to the clutch pack 30.

To minimize the torsional vibrations in the vehicle driveline it is desirable to separate the primary excitation torsional frequency produced by the engine from the torsional natural frequency of the driveline. Thus, it would be an advantage to raise the natural frequency of the dual mass clutch system to a higher frequency during engine start-up and then lower the natural frequency of the dual mass clutch system to a value lower then the engine firing frequency after the engine is running. The present invention provides this feature through the incorporation of a clutch input assembly 29 that has a very low rotational moment of inertia. Using the present invention, the torsional natural frequency of the dual mass clutch system 11 is raised by releasing the clutch pack 30 so that the rotational inertia of the massive output hub 32, pressure plate 38 and back hub 36 are uncoupled and do not contribute to the rotational inertia of the dual mass clutch system. Since the natural frequency is increased, the engine 4 can be started without exciting the dual mass clutch system 2 at its natural frequency. With prior art systems, the torsional vibration level can become very high and even destructive at engine start-up because the natural frequency of the prior art dual mass or split flywheel system could not be significantly increased and then lowered after engine start-up is achieved. After engine start-up, the clutch 17 can be activated and the dual mass clutch system 2 of the present invention operates in a conventional manner to effectively limit driveline torsional vibration.

Now referring to FIG. 3 of the drawings, a cross-sectional view of an alternate embodiment of the dual mass clutch system 2' of the present invention is shown where the clutch actuation method has been changed from a pressurized fluid based system to a ball ramp actuator.

The ball ramp actuator 60 is well known in the art. U.S. Pat Nos. 5,092,825; 5,435,201; 5,469,948; 5,499,951; 5,528,950; 5,802,915 and 5,819,883 the disclosures of which are hereby incorporated by reference, disclose various embodiments and configurations for ball ramp actuators as used in components for a vehicle driveline. The ball ramp actuator 60 is comprised of a control plate 62 and an activation plate 64 which also functions as a pressure plate (see FIG. 2, pressure plate 38). The control plate 62 includes a plurality of circumferential variable depth grooves 67 in which a like number of corresponding rolling elements 66 simultaneously transverse corresponding variable depth grooves 65 formed in the activation plate 64 such that relative rotation between the activation plate 64 and the control plate 62 results in an increase or decrease in the axial separation between the control plate 62 and the activation plate 64. In FIG. 3, this separation distance is shown at a minimum value. As relative rotation occurs between the activation plate 64 and the control plate 62, the activation plate 64 axially moves away from the control plate 62 and the clutch pack 30 is squeezed thereby frictionally coupling the clutch input shaft 18 to the transmission input shaft 19.

Relative rotation between the control plate 62 and the activation plate 64 is created by the magnetic retardation torque generated between the coil assembly 68 and the control plate 62 when an electrical current is applied to the coil 70. The electrical current in the coil 70 creates a magnetic field in the ferromagnetic coil housing 69 which applies an attraction force to the control plate 62. Since the coil assembly 68 is mounted to the clutch housing 6, a braking torque is applied to the control plate 62. Without this braking torque, the ball ramp actuator 60 does not apply a force on the clutch pack 30 and the clutch 17' is not engaged. Thus, an electrical current must be applied to the coil 70 to engage the clutch 17'.

The Belleville return spring 44 forces the activation plate 64 to the right to disengage the clutch 17' when the electrical current to the coil 70 is decreased in amplitude. It could be possible to incorporate a ball ramp torsional return spring as disclosed in U.S. Pat. Nos. 5,441,137 and 5,505,285 to force the ball ramp actuator 60 into a minimum separation state when there is little or no electrical current supplied to the coil 70.

The clutch output assembly 37' is shown in FIG. 3 as the output hub 32 joined to the driven friction discs 42, the activation plate 64, the control plate 62, the rolling elements 66 and the back hub 36A where the clutch output assembly 37' is frictionally coupled through the clutch pack 30 when the ball ramp actuator 60 is energized to engage the clutch 17'. Again, as was the case with the first embodiment of the dual mass clutch system 2, the rotational moment of inertia of the clutch input assembly 29 is minimized as compared to the clutch output assembly 37' such that when the clutch 17' is disengaged, the torsional natural frequency of the dual mass clutch system 2' is higher than the engine firing frequency during engine start-up.

Without further analysis, the foregoing will so fully reveal the gist of the present invention that other can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. A dual mass system including a flywheel and a clutch for a vehicle comprising:
    a flywheel rotatably driven by an engine;
    a torsionally compliant member attached to said flywheel;
    a clutch input shaft nonrotatably connected to said compliant member;
    a clutch input hub nonrotatably connected to said clutch input shaft;
    a clutch pack comprising;
        a drive friction disc rotating with said clutch input hub;
        a clutch outer hub having a larger outside diameter than said clutch input hub;
        a driven friction disc rotating with said clutch outer hub and frictionally interacting with said drive friction disc when said clutch is engaged;
    a clutch actuator for engaging said clutch; and
    a pressure plate axially displaced by said clutch actuator which compresses said drive friction disc and said driven friction disc together when said clutch is engaged.

2. The dual mass system of claim 1 wherein said clutch system is a wet clutch.

3. The dual mass system of claim 2 wherein said clutch actuator is a ball ramp actuator.

4. The dual mass system of claim 2 wherein said clutch actuator further comprises a pressurized source of hydraulic fluid which acts upon said pressure plate to compress said clutch pack.

5. The dual mass system of claim 4 wherein said pressurized hydraulic fluid is routed to the back of said pressure plate when the clutch is engaged.

6. The dual mass system of claim 5 further comprising a return spring to move said pressure plate away from said clutch pack.

7. The dual mass system of claim 1 wherein the rotational moment of inertia of said input hub is less than the rotational moment of inertia of said outer hub.

8. The dual mass system of claim 1 further comprising a back hub attached to said outer hub, said back hub rotating with a transmission input shaft.

9. The dual mass system of claim 8, further comprising a plurality of fluid passages formed in said back hub for routing a pressurized fluid to act upon said pressure plate.

10. The dual mass system of claim 9 wherein said fluid passages include a first passage for routing high pressure fluid to said pressure plate to force said pressure plate toward said clutch pack.

11. The dual mass system of claim 8 wherein said fluid passages include a second passage for routing fluid either toward or away from said pressure plate.

12. A dual mass system including a flywheel and a clutch for a vehicle comprising:
    a flywheel rotatably driven about an axis of rotation;
    a damper attached to said flywheel;
    a clutch input shaft nonrotatably connected to said damper;
    a clutch input hub nonrotatably connected to said clutch input shaft;
    at least one drive friction disc nonrotatably connected to said clutch input hub;
    at least one driven friction disc frictionally contacting said drive friction disc when the clutch is engaged;
    a clutch output hub nonrotatably connected to said driven friction disc;
    a clutch input assembly comprised of said clutch input hub and said drive friction disc rotating about said axis of rotation;
    a clutch output assembly comprised of said clutch output hub and said driven friction disc;
    where the rotational moment of inertia about said axis of rotation of said clutch input assembly in less than the rotational moment of inertia of said clutch output assembly when the clutch is disengaged.

13. The dual mass system of claim 12 further comprising a pressure plate axially displaced by a clutch actuator to contact and force said drive friction disc together with said driven friction disc when said clutch is engaged.

14. The dual mass clutch system of claim 12 wherein said drive friction disc and said driven friction disc are covered in a fluid.

15. The dual mass system of claim 12 wherein the rotational moment of inertia about said axis of rotation of said clutch input assembly is at least 20 percent less than the rotational moment of inertia about said axis of rotation of said clutch output assembly when the clutch is disengaged.

16. The driveline clutch system for a vehicle comprising:
    a flywheel rotationally driven by a power source;
    a torsionally compliant member having a first side attached to said flywheel and a second side attached to said first side through a compliant element;
    a clutch input assembly nonrotatably attached to said second side of said compliant member;
    a clutch output assembly frictionally driven by said clutch input assembly when the clutch system is engaged;

where a rotational moment of inertia of said input assembly is less than a rotational moment of inertia of said output assembly.

17. The driveline clutch system for a vehicle of claim 16 wherein the outside diameter of said input assembly is smaller than the outside diameter of said output assembly.

18. The driveline clutch system for a vehicle of claim 16 wherein said clutch input assembly includes an input hub nonrotatably connected to at least one drive friction disc and wherein said clutch output assembly includes an output hub nonrotatably connected to at least one driven friction disc;

where said drive friction disc is nonrotatably connected at its inside diameter to said input hub and where said driven friction disc is nonrotatably connected at its outside diameter to said output hub.

* * * * *